W. W. GUEST.
PNEUMATIC WHEEL.
APPLICATION FILED JUNE 8, 1911.
1,023,516.
Patented Apr. 16, 1912.
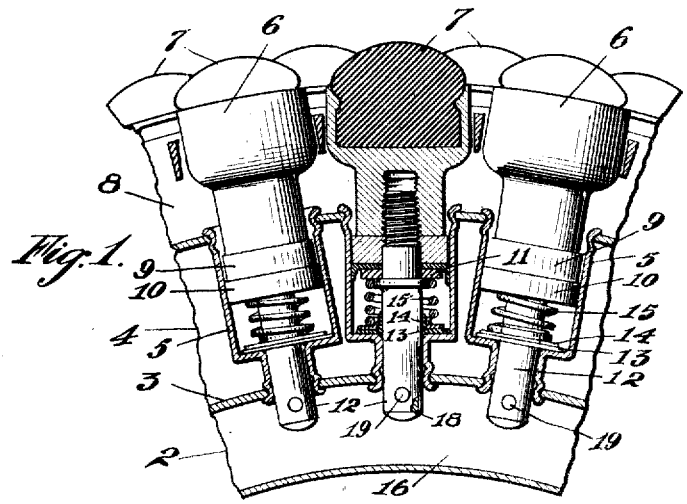
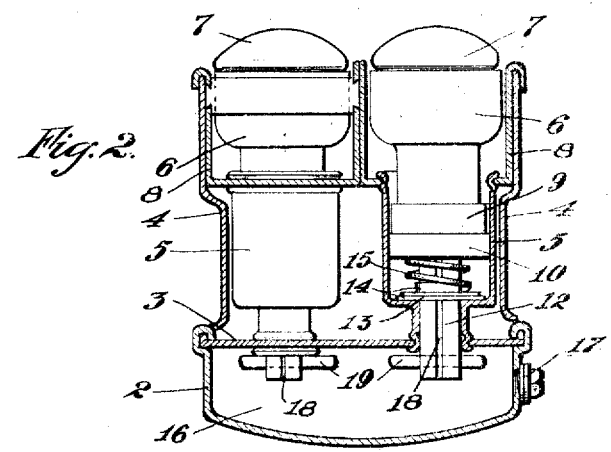
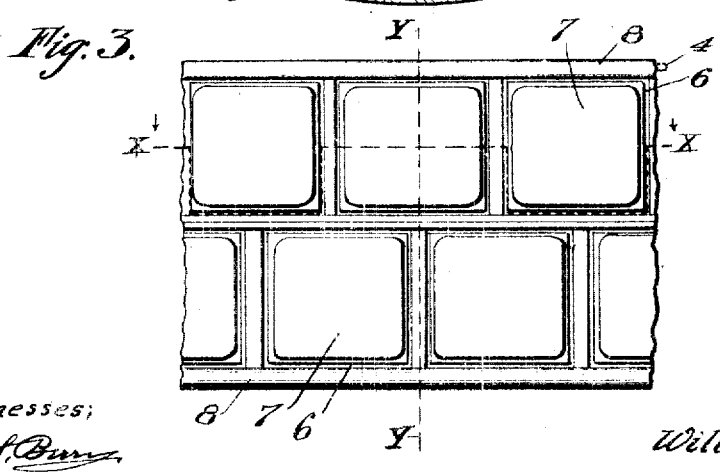
Witnesses:
Inventor
William W. Guest.
By G. H. Strong.
His Atty.

UNITED STATES PATENT OFFICE.

WILLIAM W. GUEST, OF ALAMEDA, CALIFORNIA.

PNEUMATIC WHEEL.

1,023,516.  Specification of Letters Patent.  Patented Apr. 16, 1912.

Application filed June 8, 1911. Serial No. 632,014.

*To all whom it may concern:*

Be it known that I, WILLIAM W. GUEST, citizen of the United States, residing at Alameda, in the county of Alameda and State of California, have invented new and useful Improvements in Pneumatic Wheels, of which the following is a specification.

My invention relates to improvements in vehicle wheels.

It consists of treads having sockets mounted radially in the rims and connected with plungers movable in coacting cylinders or chambers, in conjunction with an annular compressed air rim having controlled connections with the plunger chambers, whereby elastic air cushions are provided, upon which the treads bear, and wherein a supplemental compression is effected in proportion to the shocks of the road and the weight to be carried.

It comprises details of construction, which will be more fully explained by reference to the accompanying drawings, in which—

Figure 1 is a sectional elevation taken through the line X—X, Fig. 3. Fig. 2 is a transverse view taken through the line Y—Y, Fig. 3. Fig. 3 is a plan or edge view of a portion of the wheel.

The wheel will be composed of a hub with spokes, not here shown, and a rim portion, which rim portion contains the features of my invention. The parts composing this rim are preferably stamped from steel plates, and consist of a rim plate 2, with which the outer ends of the spokes may be connected, a dash pot supporting plate 3, with which the rim plate is connected as shown; and the two form an annular chamber for compressed air. Approximately in the planes of the outer sides of the rim plates are the annular face plates 4, which extend around the outer portion of the wheel and within which the dash pots 5, the tread sockets 6 and the treads 7 are contained. There may be one or a plurality of series of dash pots and corresponding treads with their sockets, disposed radially in such relation that the treads will be successively and continuously brought to bear upon the ground. The channel rims 8 are stamped to fit within the face plates 4 and have their outer edges turned over the outer edges of the face plates, and the bottom of these channel rims have openings through which the upper ends of the dash pots extend; and these upper ends of the dash pots are flanged or corrugated so that they engage the openings in the channel rims and are thus held in place. The lower ends of the dash pots are made of smaller diameter and are correspondingly flanged or corrugated to fit openings in the supporting plates 3. The outer edges of these plates are bent at an angle and engage the turned-over edges of the bottom plate 2, all of which is plainly shown in Fig. 2. The tread sockets 6 extend into the open ends of the dash pots 5, and at the inner ends carry the pistons 9, which are adapted to reciprocate in the dash pots. These pistons are here shown with cup leathers 10, which form a perfect air-tight joint within the dash pots, and are retained in place by washers, as at 11. The pistons have stems 12 which extend inwardly through the smaller diameter of the dash pots and these have collars 13 surrounding the piston rods where they pass through the inner ends of the dash pots. Retaining rings 14 serve to maintain these in place through the agency of springs 15, the ends of which rest against the washers 11 and 14. With this construction it will be seen that as the wheel revolves, any pressure upon the treads 7 will force the tread sockets 6 and the plungers 9 into the dash pots, and will thus compress any air which lies between the plungers and the bottom or inner ends of the dash pots; the cup leathers 10 and 13 making joints which will prevent any escape of the air.

The rim plate 2 and the dash pot supporting plate 3 form an annular compression chamber 16, into which the inner ends of the rods 12 reciprocate with the movements of the pistons. This compression chamber is charged with air under any desired degree of pressure through an entrance plug or valve, as at 17, and this pressure will be as much greater than the weight which will be brought upon the treads, as may be found desirable.

In order to admit air from the compression chamber to the piston chambers and interior to the dash pots, I have shown small grooves or channels 18 made in the piston or plunger rods 12, and these passages extend just within the inturned edges of the cup leathers 10 which form the joints around the piston rods so that the compressed air will normally act to force the plungers out and maintain the periphery of the treads in a normal position, the limit of which is maintained by cotter pins 19 which pass through the stems of the plunger rods 12 within the compression chamber 16 and which contact with the supporting plate 3 when the plungers are forced outwardly. This being the normal condition, and providing a sufficient pressure of compressed air for normal purposes, whenever the vehicle is in motion the treads successively pass over the ground and the weight of the vehicle or the shocks of irregularities on the road will force the treads and their sockets of the pistons 9 inwardly. As soon as this inward movement commences, the ends of the grooves or channels 18, which connect the compression chamber 16 with the interior of the plunger chamber, will be closed by reason of their passing through the cup leathers 13, thus forming a hermetical joint, and the air remaining within the plunger cylinders will then be compressed to a higher degree and thus provide the necessary increased elasticity and resistance to weight and shocks as the wheel revolves. The springs 15 yield as the plungers are forced inwardly and follow the plungers out when they again move outwardly, and thus maintain the retaining washers and cup leathers constantly in contact with their respective surfaces so as to maintain tight joints at these points.

Having thus described my invention, what I claim and desire to secure by Letters Patent is—

1. A wheel rim consisting of an annular chamber adapted to contain air under pressure, dash pots extending radially outward, plungers movable in the dash pots having stems extending into the compression chamber, joint forming leathers surrounding the plunger rod and fitting the piston, exterior treads and radially guided tread sockets therefor connected with the plungers, and grooves formed in the plunger rods normally connecting the compression chambers with the plunger chambers, said grooves being closable when the plungers are forced inwardly to increase the compression within the plunger chambers.

2. A vehicle wheel consisting of an annular chamber adapted to contain compressed air, a dash pot plate forming the outer periphery of said chamber, dash pots having the reduced inner ends fixed in said rim, plungers fitting said dash pots having plunger rods extending into the compression chamber, said rods having grooves made and extending from the compression chamber into the plunger chamber, stops limiting the outward movement of the plungers, and cup leathers surrounding the plunger rods and beyond which the grooves normally extend, said cup leathers forming stops to close the connection when the plungers are forced inwardly.

3. A vehicle wheel consisting of an annular closed chamber adapted to contain compressed air, plunger cylinders connected and radiating outwardly from said compression chamber, plungers fitting the cylinders and having rods extending into the compression chamber, and limiting stops therefor, treads adapted to travel upon the ground and guided sockets therefor connected with the plungers to force the latter inwardly under the stress of travel, connections between the inner compression chamber and the plunger cylinders, and cup leathers whereby said connections are automatically closed synchronously with the inward movement of the plungers.

4. A wheel including an annular compressed air chamber, radial dash pots connected therewith, plungers movable in said dash pots, treads carried by the plungers, and means to temporarily cut off connection with the dash pots and increase the compression therein in unison with inward movement of the plungers, said means including plunger rods having grooves which extend from the compressed air chamber into the chamber in which the plungers work, and cup leathers forming closures for the grooves.

In testimony whereof I have hereunto set my hand in the presence of two subscribing witnesses.

WILLIAM W. GUEST.

Witnesses:
  G. H. STRONG,
  CHARLES EDELMAN.